United States Patent [19]

Althoff et al.

[11] Patent Number: 5,658,669
[45] Date of Patent: Aug. 19, 1997

[54] COMPOSITE MEMBRANES AND PROCESSES FOR THEIR PRODUCTION

[75] Inventors: Olaf Althoff, Niedernhausen; Uwe Falk, Wiesbaden; Ude Scheunemann, Liederbach; Werner Prass, Mainz; Werner Hickel, Ludwigshafen, all of Germany

[73] Assignee: Hoechst Aktiengesellschaft, Frankfurt, Germany

[21] Appl. No.: 435,496

[22] Filed: May 5, 1995

[30] Foreign Application Priority Data

May 9, 1994 [DE] Germany .................. 44 16 331.2

[51] Int. Cl.[6] ............................................. B32B 27/00
[52] U.S. Cl. ................................. 428/421; 428/422
[58] Field of Search ............................. 428/421, 422

[56] References Cited

U.S. PATENT DOCUMENTS

| | | | |
|---|---|---|---|
| 4,640,865 | 2/1987 | Lancaster et al. | 428/421 |
| 4,764,405 | 8/1988 | Bauman et al. | 428/35 |

Primary Examiner—Edward J. Cain
Attorney, Agent, or Firm—Curtis, Morris & Safford, P.C.

[57] ABSTRACT

A composite membrane comprises a porous carrier membrane (A) and a fluorine-containing permselective layer (C) which is a copolymer and has a thickness of 10 to 500 nm. The copolymer of layer (C) comprises a) 10 to 80 mol % of monomer units of a vinyl ester of the formula (I)

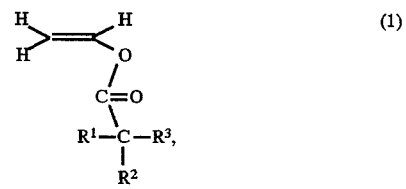

in which
R[1], R[2] and R[3] are hydrogen, alkyl radicals, cycloalkyl radicals or aryl radicals, and these radicals together have at least 5 and not more than 30 carbon atoms, b1) 5 to 50 mol % of monomer units of a vinyl alcohol of the formula (II)

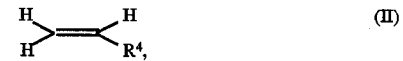

in which
R[4] is the hydroxyl group and up to 10% of the groups R[4] can be replaced by radicals of the formula OCOR[5], in which R[5] is methyl, ethyl or propyl, or b2) 5 to 50 mol % of monomer units of the formula (III)

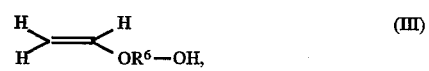

in which R[6] is a straight-chain or branched alkylene radical having 1 to 6 carbon atoms, and c) at least 10 mol % of a fluoroolefin, the chains containing hydroxyl groups being crosslinked with one another, in particular by multifunctional isocyanates. The membrane can be employed, inter alia, for gas separation and pervaporation.

17 Claims, No Drawings

COMPOSITE MEMBRANES AND PROCESSES FOR THEIR PRODUCTION

The present invention relates to a composite membrane of two or three layers, the permselective layer comprising a fluorine copolymer crosslinked on water which allows separation of gas mixtures or use for pervaporation. The invention furthermore relates to the production of such a membrane and that of a 2-layer membrane, the permselective layer of which comprises the same fluorine copolymer in non-crosslinked form.

The task of separating gas mixtures or concentrating at least one component of the gas mixture often arises in industry. This task is increasingly fulfilled with the aid of semipermeable membranes. These membranes allow gases to pass through at different rates, depending on their solubility and diffusion coefficient.

For such gas separation membranes to be suitable for industrial use, both their perviousness to gases (permeability) and selectivity and their stability during operation and with respect to solvents are of particular importance.

The permeability and the selectivity of a membrane are primarily determined by the material of the permselective layer. The permeability of a membrane for a particular gas depends both on the thickness of the active (permselective) layer and on the permeability coefficient for this gas. Experience shows, however, that materials of high selectivity have a low permeability coefficient.

All attempts to discover polymer materials which have both a high selectivity and a high permeability coefficient have therefore so far remained unsuccessful. There is a choice only between highly permeable polymers of low selectivity or selective polymers of low permeability.

To arrive at acceptable permeation rates, efforts are being made to make the thickness of the active layer (=permselective layer) as thin as possible. However, the occurrence of defects, so-called pin-holes, imposes limits on the search for ever thinner layer thicknesses.

Japan Kokai Tokkyo Koho JP 63240917 thus describes, for example, a 2-layer composite membrane for gas separation which comprises a porous support membrane (A) of a polysulfone and a selective, ultra-thin top layer (C) of a copolymer of tetrafluoroethylene and a silane containing vinyl groups.

This membrane is resistant to solvents—if it has been crosslinked; however, it has only an adverse $O_2/N_2$ selectivity and a low permeance.

However, permselective layers with layer thicknesses of about 0.05 to 0.5 μm (=50 to 500 nm) can now also be produced. The use of membranes with such layer thicknesses became possible after it was found that the pin-holes which always occur in such thin (permselective) layers could be quasi blocked with silicone rubber (Henis, J. M. S.; Tripodi, M. K.; Sep. Sci. Technol. (1980), 15, 1059).

The silicone layer can be applied to the membrane as an outer layer. However, it can also be enveloped by the support membrane layer and the permselective layer.

Such a composite membrane for gas separation having a three-layer structure is already known from DE-OS 34 15 624. It comprises an asymmetric support membrane layer of porous polymer (A), a non-porous, gas-permeable intermediate layer (B) of polyorganosiloxane and a thin layer (C) of a polymer which comprises monomer units of a fluoroolefin and/or of an unsaturated pivalic acid ester and has a high $O_2/N_2$ permeability coefficient ratio (selectivity). This layer (C) can be produced, inter alia, as a thin film on an aqueous surface by the spreading process and then applied to the polyorganosiloxane layer.

Disadvantages of this composite membrane, however, are the low resistance to solvents, which limits their use to solvent-free applications, the need to employ a highly permeable intermediate layer and the limitation to a porous asymmetric support membrane of defined hole size with silicone laminated on.

There was therefore the object of providing a stable, highly permselective layer and of producing from this composite membranes which are suitable for gas separations or pervaporation, have a high long-term stability, coupled with a good selectivity and permeability, and are stable to solvents.

A composite membrane comprising a porous carrier membrane (A) and a fluorine-containing permselective layer (C), which is a copolymer, has now been found. The composite membrane comprises a membrane in which layer (C) has a thickness of 10 to 500 nm and the copolymer of layer (C) comprises a) 10 to 80 mol % of monomer units of a vinyl ester of the formula (I)

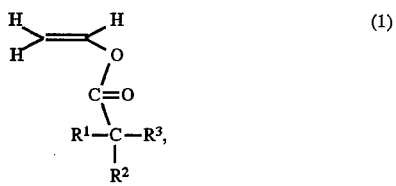

in which
$R^1$, $R^2$ and $R^3$ are hydrogen, alkyl radicals, cycloalkyl radicals or aryl radicals, and these radicals together have at least 5 and not more than 30 carbon atoms, b1) 5 to 50 mol % of monomer units of vinyl alcohol of the formula (II)

in which
$R^4$ is the hydroxyl group and up to 10% of the groups $R^4$ can be replaced by radicals of the formula $OCOR^5$, in which $R^5$ is methyl, ethyl or propyl, or b2) 5 to 50 mol % of monomer units of the formula (III)

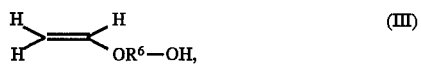

in which $R^6$ is a straight-chain or branched alkylene radical having 1 to 6 carbon atoms, and c) at least 10 mol % of a fluoroolefin, and the chains containing hydroxyl groups are crosslinked with one another.

The sum of the monomer units mentioned should make up 100%. Preferably, the hydroxyl groups of layer (C) are crosslinked by multifunctional isocyanates (in particular having 2, 3 or 4 isocyanate groups per molecule). The hydroxyl groups of units of the formulae II and III are thereby largely converted into urethane groups.

However, polyfunctional epoxides or melamine can also serve as crosslinking agents. A highly permeable intermediate layer (B) of crosslinked polyorganosiloxane can be located between the porous carrier membrane (A) and the permselective layer (C).

The copolymer of layer (C) preferably comprises
15 to 60 mol % of monomer units of a vinyl ester of the formula I, 5 to 30 mol % of monomer units of a vinyl alcohol of the formula II, or 5 to 40 mol % of monomer units of the formula III and at least 25 mol of monomer units of the monoolefin, the hydroxyl groups in the units of the formulae II and III being crosslinked.

The preparation of the non-crosslinked copolymer by free radical polymerization is prior art (EP-A-0 150 430 and EP-A-0 276 049) or is carried out analogously thereto.

Vinyl esters of the formula I which are preferably employed in the preparation of the copolymer of layer (C) are compounds in which the radicals $R^1$, $R^2$ and $R^3$ are alkyl or cycloalkyl radicals and together have 7 to 9 carbon atoms. At least one of the radicals $R^1$ and $R^2$ is preferably a methyl group.

The vinyl esters of aliphatic carboxylic acids, in particular vinyl acetate, are used in the preparation of the copolymer as a precursor for the monomer units of the formula II. If hydrolysis of the acyl radicals, i.e. the formation of crosslinkable hydroxyl groups, has not already taken place under the conditions of the polymerization in the presence of water, the hydrolysis must be carried out subsequently. This is not necessary if vinyl ethers of the formula III are employed instead in the preparation of the copolymer.

Hydroxyalkyl vinyl ethers of the formula III which can be employed in the preparation of the copolymer are, for example, hydroxymethyl vinyl ether, 2-hydroxyethyl vinyl ether, 3-hydroxy-n-propyl vinyl ether, 2-hydroxy-n-propyl vinyl ether, 2-hydroxy-1-methylethyl vinyl ether, 3-hydroxy-n-butyl vinyl ether, 2-hydroxy-2-methylpropyl vinyl ether, 5-hydroxy-n-pentyl vinyl ether and 3-hydroxy-n-butyl vinyl ether, and in particular 4-hydroxy-n-butyl vinyl ether.

The fluoroolefin used as component c), in the preparation of the copolymer can be chosen as desired from the group of fluoroolefins. The term fluoroolefin includes perfluoroolefin and mixtures of different fluoroolefins. Fluoroolefin is understood as meaning a hydrocarbon, in particular an aliphatic hydrocarbon having a-preferably terminal-double bond, the H atoms of which are at least partly substituted by F and some or all of the remaining H atoms of which can be replaced by Cl.

Fluorolefins of the formula $CF_2=CXY$ in which X and Y are identical or different and are H, F or Cl are preferably chosen as comonomers. Such comonomers are thus, for example, vinylidene fluoride, trifluoroethylene, chlorotrifluoroethylene and, in particular, tetrafluoroethylene, or also mixtures of such comonomers.

Up to 20 mol% of the abovementioned fluoroolefin of the formula $CF_2=CXY$ can be replaced by at least one fluorine compound of the formula $CF_2=CF-Z$, in which Z is a $C_1-C_8$-perfluoroalkyl radical, $C_1-C_8$-fluoroalkyl radical or $C_1-C_8$-perfluoroalkoxy radical, a perfluoro(alkoxyalkyl) radical having a total of 3 to 8 carbon atoms, or an alkyl radical or cycloalkyl radical having 1 to 10 carbon atoms.

It is preferable, however, to employ exclusively chlorotrifluoroethylene or, in particular, tetrafluoroethylene as the comonomer of component c).

A porous membrane of polysulfone, polypropylene, polyethylene, polyamide, polyimide, polyester or polyacrylonitrile or other polymers having a pore size of between 2 and 5000 nm, preferably between 5 and 250 nm, is employed as carrier membrane A. Its permeability to oxygen should he as high as possible, but at least greater than 2 $m^3/m^2h\cdot bar$. The porous membrane here can be symmetric or asymmetric. If an asymmetric membrane is employed, the side with the smaller pore openings is coated. The carrier membrane (A) is preferably a symmetric membrane.

A highly permeable, dense, pore-free intermediate layer (B) of crosslinked polyorganosiloxane, preferably having a thickness of 20 to 1000 nm, in particular 50 to 200 nm, can also be located between the porous carrier membrane (A) and the permselective layer (C). The dense double layer (A+B) should have a permeability to oxygen of at least 0.5 $m^3/m^2h\cdot bar$.

The composite membrane according to the invention can be produced in the following manner: a solution of a non-crosslinked copolymer of monomer I, fluoroolefin and monomer II or III is spread onto water together with the stoichiometric amount (based on the amount of OH groups) of a crosslinking agent. The solvents which can be employed are various solvents which allow good spreading of the solution, in particular organic solvents, such as, for example, toluene, xylene, nitropropane, butyl acetate ate, ethyl acetate, methyl ethyl ketone, methyl isobutyl ketone and mixtures thereof. Mixtures of butyl acetate and nitropropane and of butyl acetate and xylene are preferred. The content of polymer in the solution here is between 0.5 and 5%, preferably between 1 and 3%. Polyisocyanates, poly-epoxides and melamine resins with bis-(methoxymethyl)amino groups can be employed as cross-linking agents. Polyisocyanates are particularly preferred.

If polyisocyanates are employed, a crosslinking catalyst, such as, for example, dibutyltin dilaurate, can be added if appropriate. The terpolymer can be allowed to react with the crosslinking agent in solution, before it is spread onto water. However, it must be ensured here that the solution is still free-flowing. Waiting times of at least two hours are possible in most cases.

The water temperature during crosslinking is 10° to 60° C., preferably 20° to 50° C. After spreading, the copolymer is transferred by the water casting technique to the carrier membrane (A) or the intermediate layer (B) of crosslinked polyorganosiloxane bonded to (A) within a period of one hour, in particular within 2 seconds to 5 minutes, preferably 10 to 50 seconds. Thereafter, the membrane is preferably subjected to a heat treatment. This lasts 2 minutes to 2 hours at 40° to 90° C., preferably 3° to 20 minutes at 50° to 80° C.

The composite membrane thus obtained, with 2 or 3 layers, has a permeability to oxygen of 0.01 to 2 $m^3/m^2h\cdot bar$, in particular 0.05 to 1 $m^3/m^2h\cdot bar$, and an oxygen/nitrogen selectivity of 3 to 7, preferably 4.5 to 6.

Because of the crosslinking of the permselective layer, it is stable to solvents and can thus also be employed in a solvent-containing atmosphere for pervaporation and for gas separation, for example for concentration of oxygen or nitrogen from air.

The invention furthermore relates to a composite membrane comprising a carrier membrane (A) and a non-crosslinked permselective layer (C) of a solid fluorine-containing copolymer. It likewise comprises the monomer I, fluoro- olefin and the monomer II or III, in which the hydroxyl groups, however, are non-crosslinked.

The spread layer is likewise transferred to the support membrane (A) from an aqueous surface. This membrane can also be employed for gas separation and pervaporation. However, its resistance to solvents is somewhat lower.

The invention is illustrated in more detail by the examples.

EXAMPLE 1

0.27 g of aromatic polyisocyanate prepolymer based on diphenylmethanediisocyanate (16% of isocyanate groups per kg)=®Desmodur E21 and 2 µl of a 1% strength dibutyltin dilaurate solution in butyl acetate are added to 1 g of a 50% strength solution of the fluorine-containing terpolymer of tetrafluoroethylene, ®Versatic acid (9/10)-vinyl ester and vinyl alcohol in butyl acetate, and the mixture is topped up to 25 g with a mixture of 75% of butylacetate and 25% nitropropane. 0.1 ml of this solution is spread onto water (25° C.; 300 cm²), and after the solvent has evaporated, the product is transferred to a membrane of ®Celgard 2400 (polypropylene of porosity 38%, thickness 25±2.5 µm and pores having a size of 0.05×0.125 µm) within 1 minute. The composite membrane is after-treated at 60° C. for a further 20 minutes. The transferred and crosslinked layer is stable to acetone and ethanol.

The composite membrane thus produced has a permeability to oxygen of 0.1 m³/m²h·bar at a selectivity for nitrogen of 5.

EXAMPLE 2

0.3 ml of a 50% strength methyl triacetoxysilane solution in butyl acetate and 0.1 ml of a 5% strength dibutyltin dilaurate solution in butyl acetate are added to a solution of 1 ml of polydimethylsiloxane having two terminal silanol groups and 5 ml of butyl acetate. 50 µl of this solution are spread onto an aqueous surface (300 cm²). After 1 minute at a water temperature of 40° C., the film crosslinks and becomes viscoelastic on the aqueous surface. It is then transferred to a carrier (®Celgard 2400) and dried at 50° C. in a drying cabinet for 30 minutes. Subsequent measurement of the permeance and determination of the separation factor show an oxygen permeance of 2 to 4 m³ (STP)/m²h·bar and a separation factor of 1.9 to 2.1 for nitrogen.

0.25 g of aliphatic polyisocyanate based on hexamethylene diisocyanate (16.5% of isocyanate groups per kg)= Desmodur N75 and 20 µl of a 0.1% strength dibutyltin dilaurate solution in butyl acetate are added to 1 g of a 50% strength solution of a fluorine-containing terpolymer of tetrafluoroethylene, Versatic acid (9/10)-vinyl ester and vinyl alcohol in butyl acetate, and the mixture is topped up to 25 g with a mixture of butyl acetate (75%) and nitropropane (25%). 50 µl of this solution are spread onto water (40° C.; 300 cm²), and, after the solvent has evaporated, the product is transferred to the ®Celgard 2400 membrane described above, which is coated with crosslinked silicone, within 1 minute and after-treated at 80° C. for 10 minutes. The membrane thus obtained is resistant to acetone and ethanol and has an oxygen/nitrogen selectivity of 4.2 at a flow rate of 0.4 m³/m²h·bar.

We claim:

1. A composite membrane comprising a porous carrier membrane (A) and a fluorine-containing permselective layer (c), which is a copolymer, wherein the layer (C) has a thickness of 10 to 500 nm and the copolymer of layer (C) comprises a) 10 to 80 mol % of monomer units of a vinyl ester of the formula (I)

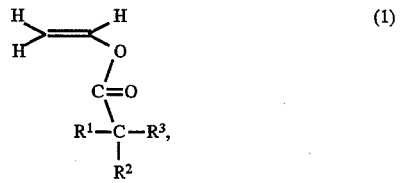

in which $R^2$, $R^2$ and $R^3$ are hydrogen, alkyl radicals, cycloalkyl radicals or aryl radicals, and these radicals together have at least 5 and not more than 30 carbon atoms, b1) 5 to 50 mol % of monomer units of a vinyl alcohol of the formula (II)

in which $R^4$ is the hydroxyl group and up to 10% of the groups $R^4$ can be replaced by radicals of the formula $OCOR^5$, in which $R^5$ is methyl, ethyl or propyl, or b2) 5 to 50 mol % of monomer units of the formula (III)

in which $R^6$ is a straight-chain or branched alkylene radical having 1 to 6 carbon atoms, and c) at least 10 mol % of a fluoroolefin, and the chains containing hydroxyl groups are crosslinked with one another.

2. A composite membrane as claimed in claim 1, wherein the hydroxyl groups of the copolymer of layer (C) are crosslinked by multifunctional isocyanates.

3. A composite membrane as claimed in claim 1, wherein a highly permeable dense intermediate layer (B) of crosslinked polyorganosiloxane is located between the porous carrier membrane (A) and layer (C).

4. A composite membrane as claimed in claim 1, wherein the porous carrier membrane (A) is a symmetric membrane.

5. A composite membrane as claimed in claim 4, wherein the porous carrier membrane (A) comprises polypropylene.

6. A composite membrane as claimed in claim 1, wherein the radicals $R^2$, $R^2$ and $R^3$ in the monomer units of the formula I are alkyl or cycloalkyl radicals and together have 7 to 9 carbon atoms.

7. A composite membrane as claimed in claim 6, wherein at least one of the alkyl radicals $R^2$, $R^2$ and $R^3$ is a methyl group.

8. A composite membrane as claimed in claim 1, wherein the radical $R^6$ in the monomer units of the formula III is the 1,4-butylene radical.

9. A composite membrane as claimed in claim 1, wherein the fluoroolefin (C) in the copolymer has the formula (Iv)

in which X and Y are identical or different and are H, F or Cl, and 0 to 20% of the fluoroolefin units can be replaced by a compound of the formula $CF_2=CFZ$, in which Z is a $C_1-C_8$-perfluoroalkyl radical, $C_1-C_8$-fluoroalkyl radical or $C_1-C_8$-perfluoroalkoxy radical, a perfluoro-(alkoxyalkyl) radical having a total of 3 to 8 carbon atoms or an alkyl radical or cycloalkyl radical having 1 to 10 carbon atoms.

10. A composite membrane as claimed in claim 9, wherein the fluoroolefin of the copolymer is chlorotrifluoroethylene or tetrafluoroethylene.

11. A process for the production of a composite membrane as claimed in claim 2, which comprises dissolving a terpolymer of a) 10 to 80 mol % of monomer units of a vinyl ester of the formula (I)

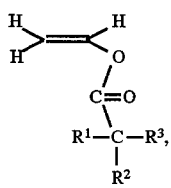

in which

R$^1$, R$^2$ and R$^3$ are alkyl radicals or cycloalkyl radicals, these radicals together have at least 5 and not more than 26 carbon atoms and one of the radicals can be hydrogen, b1) 5 to 50 mol % of vinyl alcohol units of the formula (II)

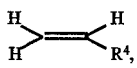

in which

R$^7$ is the hydroxyl group and up to 10% of the groups R$^7$ can be replaced by radicals of the formula OCOR$^5$, in which R$^5$ is methyl, ethyl or propyl, or b2) 5 to 50 mol % of monomer units of the formula (III)

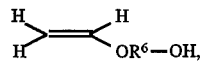

in which R$^6$ is a straight-chain or branched alkylene radical having 1 to 6 carbon atoms, and c) at least 10 mol % of a fluoroolefin, in a solvent, mixing the solution with a multifunctional organic isocyanate, spreading the solution onto water, the concentration of the terpolymer and the layer thickness of the solution on the water being co-ordinated such that the desired layer thickness of (C) is obtained, allowing the solvent to evaporate and transferring the resulting permselective layer onto a porous carrier membrane (A).

12. The process as claimed in claim 11, wherein the solution is prepared in an organic solvent.

13. The process as claimed in claim 11 wherein the terpolymer is allowed to react with the isocyanate in solution, before the solution is spread onto water, with the proviso that the solution is still free-flowing.

14. The process as claimed in claim 11, wherein the reaction of the terpolymer with the organic isocyanate takes place in the presence of dibutyltin dilaurate.

15. The method of separating gas mixtures which comprises passing gases through the membrane as claimed in claim 1 to achieve gas separation.

16. The method of pervaporation of gases which comprises the step of passing gases through the membrane as claimed in claim 1 to achieve gas pervaporation.

17. A composite membrane comprising a porous carrier membrane (A) and a fluorine-containing permselective layer (C) which is a copolymer, wherein the layer (C) has a thickness of 10 to 500 nm and the copolymer of layer (C) is non-crosslinked and comprises a) 10 to 80 mol % of monomer units of a vinyl ester of the formula (I)

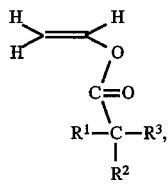

in which

R$^1$, R$^2$ and R$^3$ are hydrogen, alkyl radicals, cycloalkyl radicals or aryl radicals, and these radicals together have at least 5 and not more than 30 carbon atoms, b1) 5 to 50 mol % of monomer units of a vinyl alcohol of the formula (II)

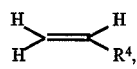

in which

R$^4$ is the hydroxyl group and up to 10% of the groups R$^4$ can be replaced by radicals of the formula OCOR$^5$, in which R$^5$ is methyl, ethyl or propyl, or b2) 5 to 50 mol % of monomer units of the formula (III)

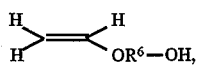

in which R$^6$ is a straight-chain or branched alkylene radical having 1 to 6 carbon atoms, and c) at least 10 mol % of a fluoroolefin.

* * * * *